US008038354B2

(12) United States Patent
Nielson et al.

(10) Patent No.: US 8,038,354 B2
(45) Date of Patent: Oct. 18, 2011

(54) HIGH DENSITY OPTICAL CONNECTOR

(75) Inventors: Jeffrey D. Nielson, Wylie, TX (US); Bradley Billman, Denton, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 227 days.

(21) Appl. No.: 12/363,100

(22) Filed: Jan. 30, 2009

(65) Prior Publication Data
US 2010/0178008 A1     Jul. 15, 2010

Related U.S. Application Data

(60) Provisional application No. 61/144,631, filed on Jan. 14, 2009.

(51) Int. Cl.
*G02B 6/38* (2006.01)
(52) U.S. Cl. ............................................. 385/59; 385/60
(58) Field of Classification Search ........................ None
See application file for complete search history.

(56) References Cited

U.S. PATENT DOCUMENTS

| | | |
|---|---|---|
| 4,461,537 A | 7/1984 | Raymer, II et al. |
| 5,076,656 A | 12/1991 | Briggs et al. |
| 5,080,461 A | 1/1992 | Pimpinella |
| 5,123,073 A | 6/1992 | Pimpinella |
| 5,257,332 A | 10/1993 | Pimpinella |
| 5,386,486 A | 1/1995 | Fan et al. |
| 5,542,013 A | 7/1996 | Kaplow et al. |
| 6,074,100 A | 6/2000 | Rowland et al. |
| 6,305,849 B1 | 10/2001 | Roehrs et al. |
| 6,625,351 B2 | 9/2003 | Cox et al. |
| 7,031,567 B2 | 4/2006 | Grinderslev et al. |
| 2002/0009261 A1 | 1/2002 | Bhagavatula et al. |
| 2003/0223703 A1 | 12/2003 | Chen et al. |
| 2004/0091214 A1 | 5/2004 | Finona |
| 2005/0036735 A1 | 2/2005 | Oosterhuis et al. |
| 2006/0257076 A1 | 11/2006 | Seeley |
| 2007/0058907 A1 | 3/2007 | Mynott et al. |
| 2007/0211999 A1 | 9/2007 | Kobayashi et al. |
| 2007/0292083 A1 | 12/2007 | Nielson et al. |

FOREIGN PATENT DOCUMENTS

| | | |
|---|---|---|
| DE | 26 49 347 A1 | 5/1977 |
| DE | 42 21 040 A1 | 1/1994 |
| EP | 0 024 958 A1 | 3/1981 |
| EP | 0 519 219 A2 | 12/1992 |
| EP | 1 990 665 A1 | 11/2008 |
| GB | 2 145 534 A | 3/1985 |
| GB | 2 428 490 A | 1/2007 |
| WO | 2006/093798 A2 | 9/2006 |
| WO | WO 2007/009676 A1 | 1/2007 |

*Primary Examiner* — Sung H Pak
(74) *Attorney, Agent, or Firm* — Muncy, Geissler, Olds & Lowe, PLLC

(57) ABSTRACT

A multi-channel fiber optic connector includes a first connector housing and a mating second connector housing. The first connector housing includes a plurality of abutting first termini and a first guidance feature amongst the plurality of abutting first termini to form a first grouping. A circular containment sleeve surrounds the first grouping. The second connector housing includes a plurality of abutting second termini and a second guidance feature amongst the plurality of abutting second termini to form a second grouping. When the first and second connector housings are mated, the first guidance feature cooperates with the second guidance feature, and the plurality of abutting second termini enter into the containment sleeve to assume an end-to-end alignment with the plurality of abutting first termini. The termini may be formed as ceramic ferrules and the guidance features may be formed as an extending pin amongst one of the plurality of termini for filing a void space amongst the other plurality of termini.

20 Claims, 8 Drawing Sheets

HIGH DENSITY OPTICAL CONNECTOR

This application claims the benefit of U.S. Provisional Application No. 61/144,631, filed Jan. 14, 2009, the entire contents of which are herein incorporated by reference.

BACKGROUND OF THE INVENTION

1. Field of the Invention

The present invention relates to fiber optic connectors. More particularly, the present invention relates to a multi-channel connector of robust design with a high density of channels, which can be easily fabricated and repaired and which has improved tolerances.

2. Description of the Related Art

Multi-channel fiber optic connectors are known in the background art. For example, in an eight channel connector of the background art, one connector housing would hold eight ferrules terminating eight optical fibers. When the connector housing is mated with a complimentary housing (e.g. on a back plane), eight ferrules held by the complimentary housing would need to precisely align with the eight ferrules of the connector housing. Some multi-channel connectors in the background art use individual alignment sleeves to align opposing ferrules. The thickness of the sleeve and the thickness of the structure to hold the sleeve combine to increase the distance between adjacent channels and greatly reduce the connector density.

It is understood in the background art, that the ferrules of the connector housing must be precisely aligned with the ferrules of the complimentary housing or signal attenuation will occur in the channels of the misaligned ferrules. Therefore, it was an obvious design parameter in the background art to make the ferrule to connector housing attachments extremely fixed and precisely located. Any slight deviation of a ferrule from its intended position within the connector housing led to poor performance of the channel of the multi-channel connector.

SUMMARY OF THE INVENTION

Applicants have appreciated drawbacks in the multi-channel connectors of the background art.

It is expensive and difficult to manufacture multi-channel connectors in accordance with the background art due to the precise tolerances required between adjoining connector halves. Because of the required close tolerances, the failure rate of tested new multi-channel connectors can be high. Also, if one channel of a multi-channel connector fails, the entire multi-channel connector is considered a failure and replaced. This is time consuming and wasteful.

It is an object of the present invention to address one or more of the drawbacks of the background art.

It is an object of the present invention to provide a multi-channel connector, which is easier and/or less expensive to build.

It is an object of the present invention to provide a multi-channel connector, which can have slight fluctuations in the ferrule placement within the connector housing, yet exhibit better alignment between the set of ferrules in the connector housing and the set of ferrules in the complementary housing, as compared to the background art.

These and other objects are accomplished by a multi-channel fiber optic connector including a first connector housing and a mating second connector housing. The first connector housing includes a plurality of abutting first termini and a first guidance feature amongst the plurality of abutting first termini to form a first grouping. A circular containment sleeve surrounds the first grouping. The second connector housing includes a plurality of abutting second termini and a second guidance feature amongst the plurality of abutting second termini to form a second grouping. When the first and second connector housings are mated, the first guidance feature cooperates with the second guidance feature, and the plurality of abutting second termini enter into the containment sleeve to assume an end-to-end alignment with the plurality of abutting first termini.

Optionally, the termini may be formed as ceramic ferrules and the guidance features may be formed as an extending pin amongst one of the plurality of termini for filing a void space amongst the other plurality of termini.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1:
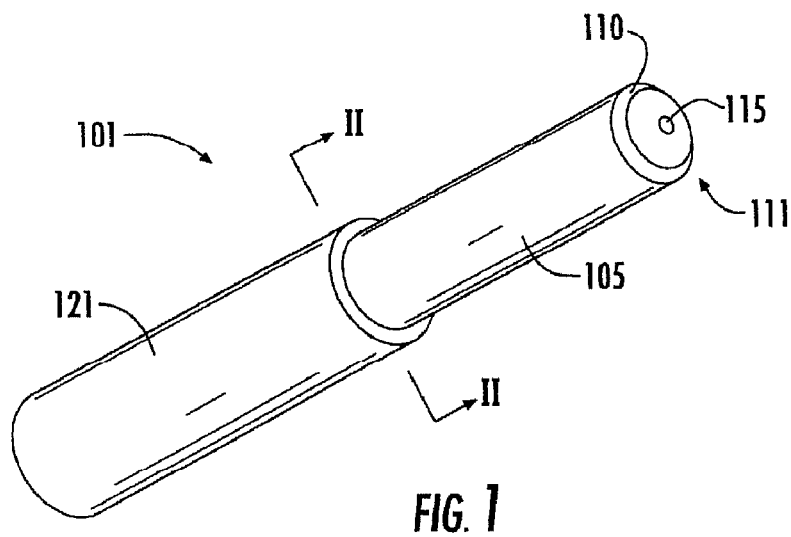
FIG. 1 is a perspective view of a ferrule and a retaining sleeve for a terminus used in a connector, in accordance with the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIGS. 1-6 depict an expanded beam terminus 103 for use in conjunction with the multi-channel fiber optic connector of the present invention. The expanded beam terminus 103 will be described in general detail herein. However, more exacting details about the expanded beam terminus 103 can be found in Applicants' co-pending application Ser. No. 12/337,212, filed Dec. 17, 2008, which is incorporated herein by reference.

FIG. 1 is a perspective view of a first part 101 of the terminus 103. The first part 101 includes a ferrule 105, in the form of a one-piece integral structure generally cylindrical in shape, made of ceramic (e.g., zirconia, glass, alumina), and having an outside diameter of about 750 um.

Figure 2:
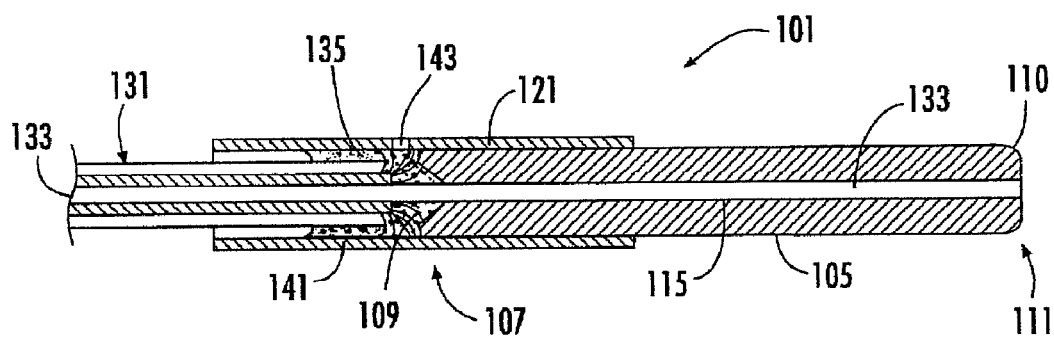
FIG. 2 is a cross sectional view taken along line II-II in FIG. 1.

As best seen in FIG. 2, a first end 107 of the ferrule 105 includes a conical entrance 109. The conical entrance 109 is generally centered in the first end 107. A second end 111 of the ferrule 105 is generally flat (i.e., may include a slight radius). The second end 111 of the ferrule 105 may optionally include a beveled edge 110 around its perimeter. A bore 115 passes through the center of the ferrule 105 from a center of the first conical entrance 109 to a center of the second end 111 of the ferrule 105.

The first part 101 of the terminus 103 also includes a retaining sleeve 121. The retaining sleeve 121 is generally cylindrical in shape, made of metal (such as stainless steel), and has an inner diameter approximately equal to or slightly less than 750 um (i.e., slightly less than the outer diameter of the ferrule 105 to create a pressure fit of the ferrule 105 within the retaining sleeve 121. An epoxy may alternatively or additionally be used to fix the ferrule 105 within the retaining sleeve 121). Of course, the retaining sleeve 121 could be made of other materials, such as ceramic, polymer or composite materials. Also, the retaining sleeve 121 could be differently shaped and sized, so long as the ferrule 105 could be registered into the retaining sleeve 121, as illustrated in FIGS. 1 and 2.

Now, an assembly of the first part 101 of the terminus 103 to a fiber optic cable or cordage 131 will be described. It is envisioned that the assembly of the cordage 131 to the first part 101 of the terminus could be performed by a technician in the field, as well as in a factory environment. First, the cordage 131 is passed through the retaining sleeve 121. Next, an outer layer of the cordage 131 is removed to expose a section of the light carrying fiber 133 (approximately as long as the ferrule 105) and a short section of the cable strength members, e.g., KEVLAR fibers 135, which surround the light carrying optical fiber 133 (as depicted in FIG. 2).

The light carrying optical fiber 133 is inserted into the bore 115 at the first end 107 of the ferrule 105 using the first conical entrance 109 as a guide. The optical fiber 133 is passed through the bore 115 to slightly extend out of the second end 111 of the ferrule 105. The optical fiber 133 may be coated with an epoxy prior to being inserted into the bore 115. At the second end 111 of the ferrule 105, the optical fiber 133 is cut flush with the second end 111. Then, the optical fiber 133 and the second end 111 are polished, in a traditional manner as known in the art.

The retaining sleeve 121 is slid over the cordage 131 to cover the junction between the cordage 131 and the ferrule 105. An epoxy or another type of adhesive 141 is inserted into the junction area where the cordage 131 meets the ferrule 105. The adhesive 141 is illustrated with dots in FIG. 2 and need not have any particular optical characteristics. The adhesive 141 may be inserted into this area using a syringe through the end of the retaining sleeve 121, which does not possess the ferrule 105. Alternatively or additionally, the syringe may be inserted through an optional hole 143 in a sidewall of the retaining sleeve 121. The adhesive 141 adheres to the KEVLAR fibers 135, the end of the cordage 131, the retaining sleeve 121, the optical fiber 133, and/or the first end 107 of the ferrule 105. EPOTEK 353ND and HYSOL 151 by Locktite work well.

Figure 3:
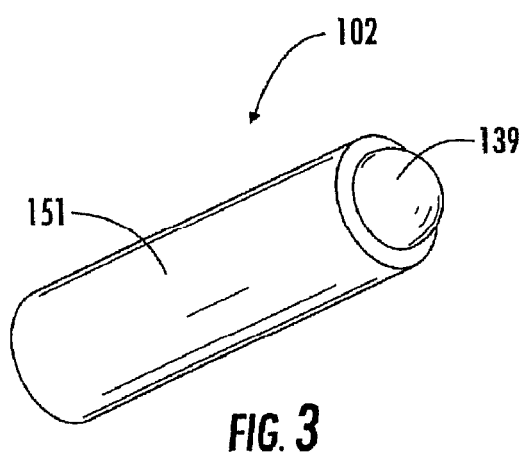
FIG. 3 is a perspective view of a cap sleeve for the ferrule of FIG. 1.
Figure 4:
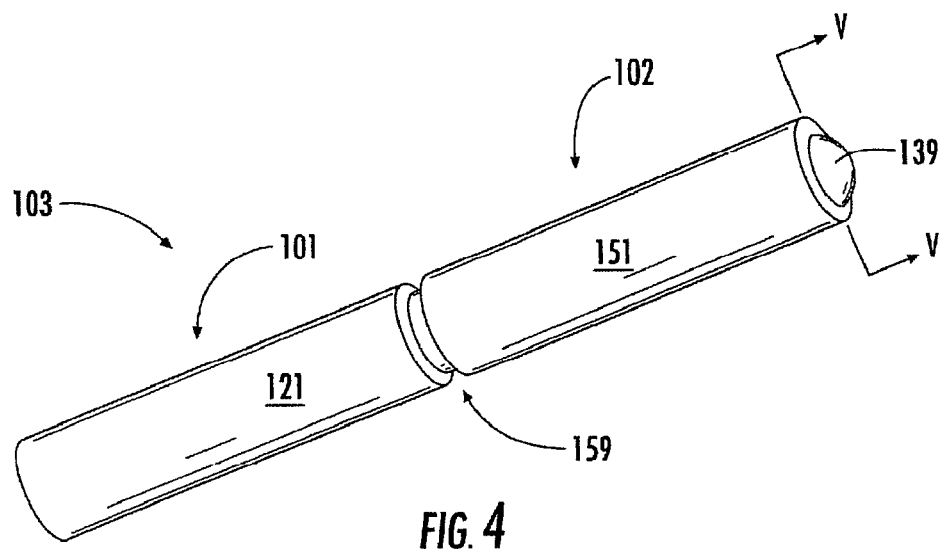
FIG. 4 is a perspective view of the cap sleeve of FIG. 3 slid over the ferrule of FIG. 1 to form the terminus.
Figure 5:
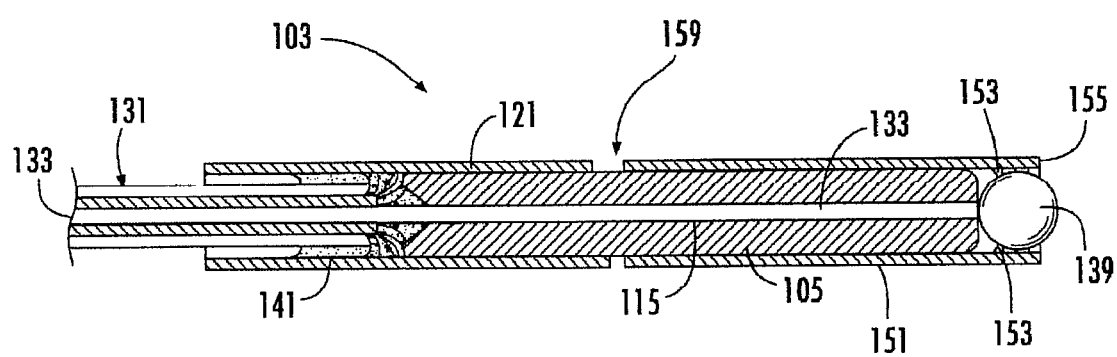
FIG. 5 is a cross sectional view taken along line V-V in FIG. 4.

FIG. 3 is a perspective view of a second part 102 of the terminus 103. The second part 102 includes a cap sleeve 151. In a preferred embodiment, the cap sleeve 151 is a one-piece integral structure in the shape of an open ended tubular cylinder or an open ended split cylinder (having a split along its sidewall from a first open end to a second open end which can slightly part or open to expand the inner diameter of the cap sleeve 151) and has an inner diameter approximately equal to or slightly greater (e.g., about one to two microns) than 750 um (i.e., slightly greater than the outer diameter of the ferrule 105). In a preferred embodiment, the cap sleeve 151 is made of ceramic (e.g. zirconia, glass, alumina), but the cap sleeve 151 could be made of other materials, such as metal, polymer or composite materials. Also, the cap sleeve 151 could be differently shaped and sized, so long as the ferrule 105 can be registered into the cap sleeve 151, as illustrated in FIGS. 4 and 5. In a preferred embodiment, the cap sleeve 151 is slid over the ferrule 105 and is attached thereto using an epoxy with no intervening structures residing between the cap sleeve 151 and the ferrule 105.

The second part 102 of the terminus 103 also includes a lens 139. In a preferred embodiment, the lens 139 is spherical in shape with a diameter of about 100 to 3,000 um (e.g., 125 um, 300 um, 500 um, 750 um, 1,250 um 2,500 um), is formed of sapphire, and has an antireflective coating. However, other types and sizes of lens may be employed. For example, the lens 139 could have other shapes such as a barrel, planoconvex or aspherical; the lens 139 could be formed of other materials like optical glass, cubic zirconia, quartz, or quartz-like materials; and the lens 139 could be uncoated.

The index of refraction of the optical fiber 133 is typically 1.46 to 1.49 (e.g., less than approximately 1.5). However, it is envisioned that the optical fiber 133 could have an index of refraction which slightly higher, such as an index of refraction which is less than 1.6. The index of refraction for the lens 139 will be set greater than 1.5, and usually greater than 1.6. Desirably, the index of refraction of the lens 139 is greater than the index of refraction of the optical fiber 133. For example, if the index of refraction of the optic fiber 133 is less than 1.6, the index of refraction of the lens 139 is greater than 1.6. As another example, if the index of refraction of the lens 139 is greater than 1.5, the index of refraction of the optical fiber 133 is less than 1.5.

The lens 139 is attached within the cap sleeve 151 by an epoxy 153, as best illustrated in the cross sectional view of FIG. 5. Alternatively, the lens 139 may be integrally formed within the cap sleeve 151. In other words, the cap sleeve 151 and lens 139 may be formed as a unitary piece of an optical glass or optical grade polymer, such as polycarbonate, with the lens 139 being molded and/or turned down directly in place within the cap sleeve 151.

To attach the cap sleeve 151 to the ferrule 105, an epoxy could be applied to the outer surfaces of the ferrule 105 and/or the inner surfaces of the cap sleeve 151 prior to placing the cap sleeve 151 over the second end 111 of the ferrule 105. A "capped" ferrule 105 would effectively convert the termination into an expanded beam termination.

FIG. 5 is a cross sectional view taken along line V-V in FIG. 4. As seen in FIGS. 4 and 5, the lens 139 slightly protrudes from an end face 155 of the cap sleeve 151. Also, the end of the optical fiber 133, which is flushed with the second end 111 of the ferrule 105 directly abuts the lens 139. In such a configuration, no optical epoxy need reside between the optical fiber 133 and lens 139 interface. As the lens 139 has a diameter which is several multiples larger than a diameter of a cylindrical shape of the optical fiber 133, the surfaces of the facing optical fiber and spherical lens begin to approximate parallel surfaces. For example, the spherical lens may have a diameter which is at least three times greater (and more preferably about four or more times greater) than a diameter of the optical fiber 133. By making the lens 139 so large relative to the optical fiber 133, spherical aberration problems with the lens 139 are reduced.

Although FIG. 5 illustrates the end of the optical fiber 133, flushed with the second end 111 of the ferrule 105, directly abutting the lens 139, it may be desirable to space the end of the optical fiber 133 from the lens 139. The lens 139 will have a focal point determined by factors such as the index of refraction of the lens 139 and the shape of the lens 139. In certain embodiments, where the focal point of the lens 139 is spaced from the outer physical edge of the lens 139, it may be desirable to locate the end of the optical fiber 133 at the focal point of the lens 139, i.e., a certain distance from the lens 139. The gap between the end of the optical fiber 133 and the lens 139 may be an air gap or filled by optical epoxy, or an obvious equivalent like an optical gel.

Figure 6:
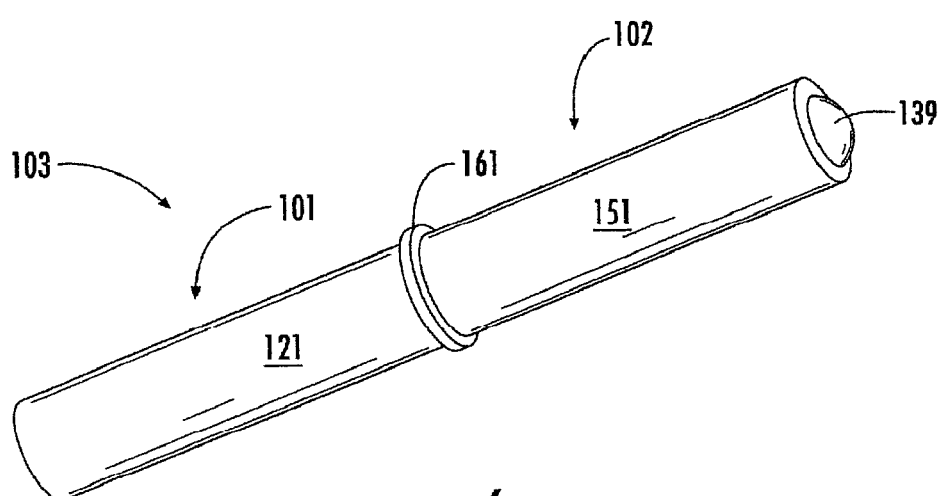
FIG. 6 is a perspective view similar to FIG. 4, but illustrates a washer captured on the terminus.

As seen in FIGS. 4 and 5, the cap sleeve 151 does not completely seat against the retaining sleeve 121. Rather, a gap 159 circumscribes the area between the cap sleeve 151 and the retaining sleeve 121. This gap 159 serves the purpose of holding a retaining feature, e.g., providing an anchoring structure for interacting with the connector of the present invention. For example, FIG. 6 illustrates a washer 161 captured within the gap 159. The washer 161 will interact the empty gaps 159 of other termini 103 and with structural elements of the connector of the present invention to fix the termini 103 to the connector, as will be explained in more detail with reference to FIGS. 9 and 13-15 below.

Figure 7:
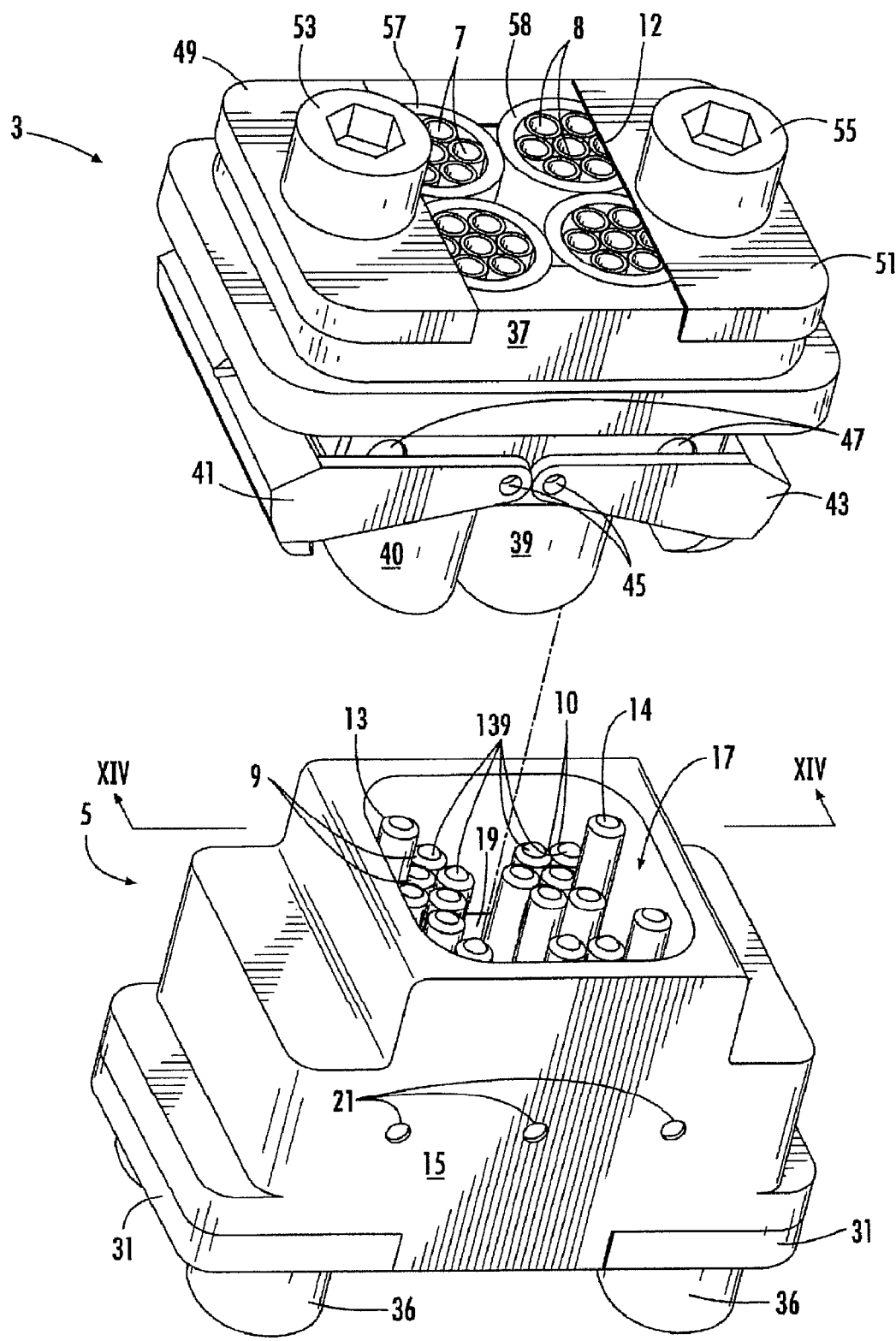
FIG. 7 is a perspective view of first and second connector halves prior to mating.
Figure 8:
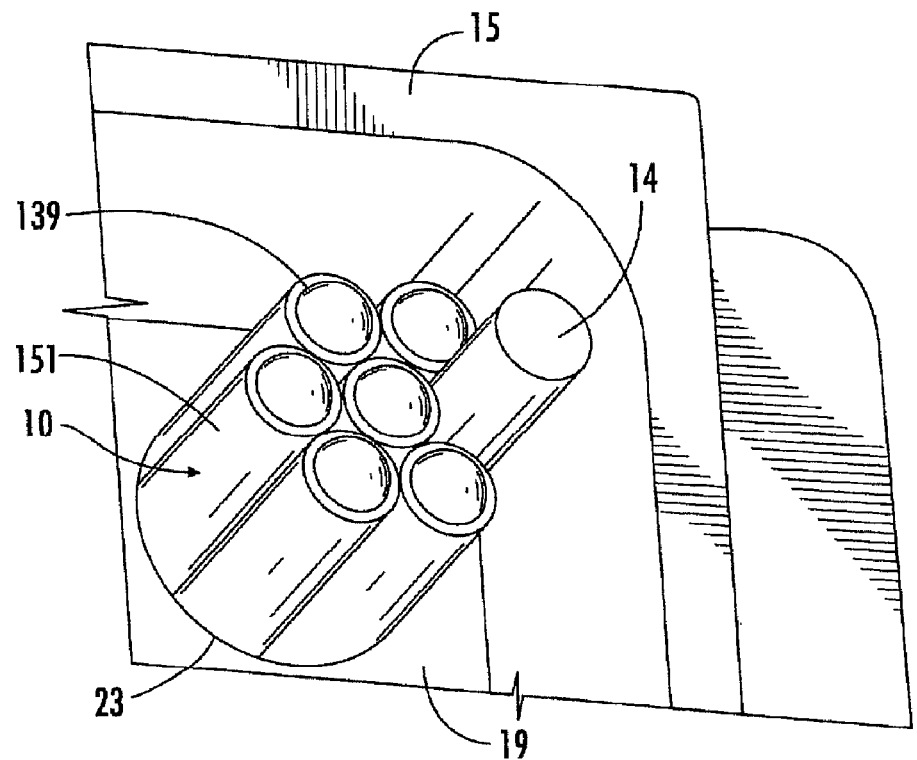
FIG. 8 is a close-up perspective view of a grouping of termini and an guidance feature on the second connector half.

FIG. 7 is a perspective view of a fiber optic connector, in accordance with one embodiment of the present invention. The fiber optic connector has a first connector housing 3 and a mating, second connector housing 5. Within the first connector housing 3, there exists a plurality of first termini 7. Within the second connector housing 5, there exists a plurality of second termini 9. Each terminus of the plurality of first and second termini 7 and 9 may be formed identical to the terminus 103 depicted in FIGS. 1-5. In other words, each of the plurality of first termini 7 and the plurality of second termini 9 may include a ferrule 105 fixing a single optical fiber 133 with a lens 139 attached at an end of the ferrule 105. However, it should be appreciated that the fiber optic connector of the present invention could employ first and/or second termini 7 and/or 9 with other structures, if desired.

In the illustrated embodiment, the termini in the first connector housing 3 are clustered into four groupings and the termini in the second connector housing 5 are clustered into four groupings. A first grouping in the first connector housing 3 includes the plurality of abutting first termini 7 and a first guidance feature 11 amongst the plurality of abutting first termini 7 (See FIGS. 12, 13 and 15). A first containment sleeve 36 (FIGS. 11 and 13), circular in cross section, surrounds the first grouping. A second grouping in the second connector housing 5 includes the plurality of abutting second termini 9 and the second guidance feature 13 amongst the plurality of abutting second termini 9.

The first connector housing 3 further includes a plurality of abutting third termini 8 and a third guidance feature 12 amongst the plurality of abutting third termini 8 to form a third grouping. A second containment sleeve 38 surrounds the third grouping. Likewise, the second connector housing 5 includes a plurality of abutting fourth termini 10 and a fourth guidance feature 14 amongst the plurality of abutting fourth termini 10 to form a fourth grouping.

Figure 15:
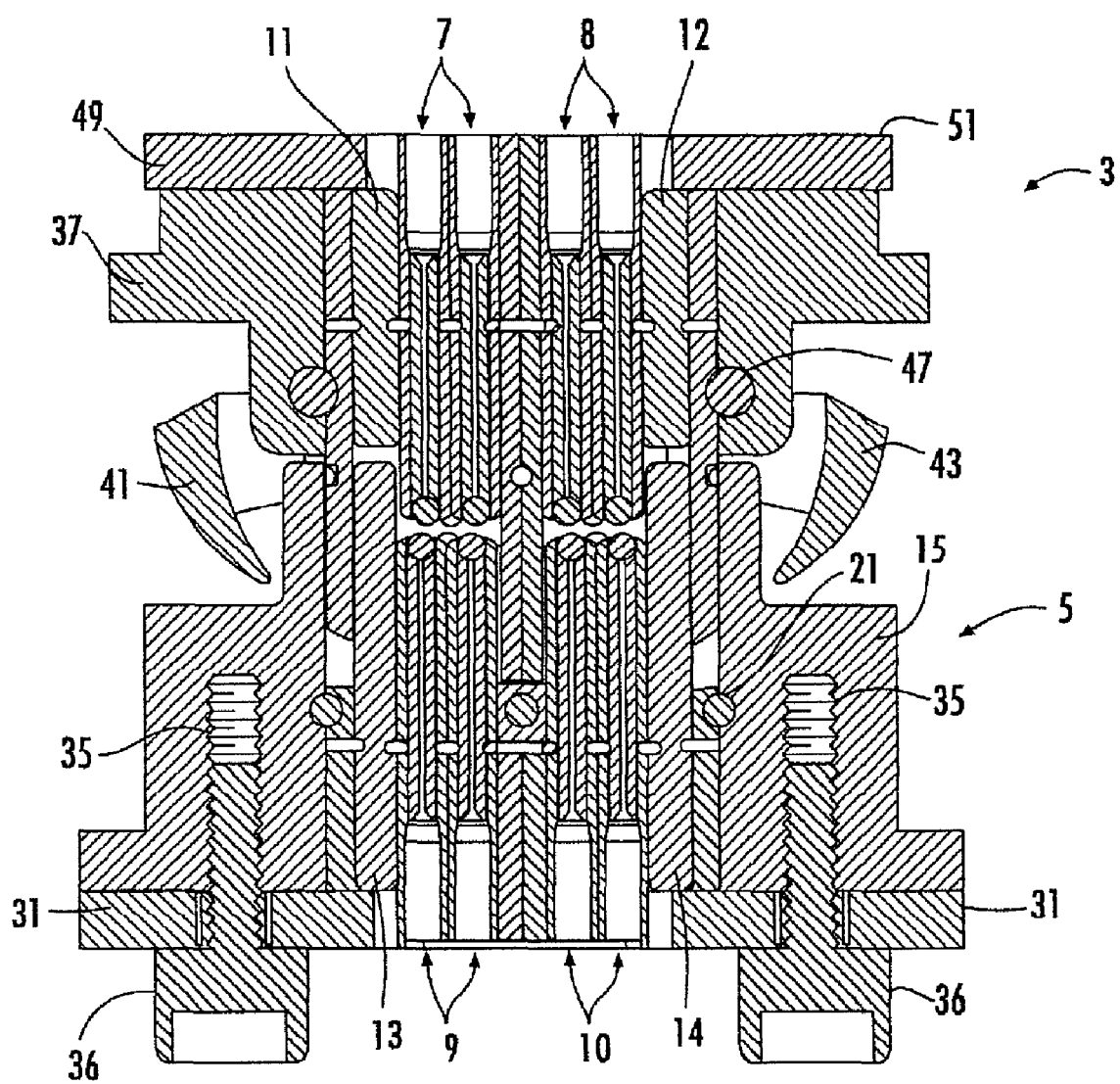
FIG. 15 is a cross sectional view showing mated first and second connector housings.

When the first and second connector housings 3 and 5 are mated, the first guidance feature 11 cooperates with the second guidance feature 13, the third guidance feature 12 cooperates with the fourth guidance feature 14, the plurality of abutting second termini 9 enter into the first containment sleeve 36 to assume an end-to-end alignment with the plurality of abutting first termini 7, and the plurality of abutting fourth termini 10 enter into the second containment sleeve 38 to assume an end-to-end alignment with the plurality of abutting third termini 8, as will be more fully understood with reference to FIG. 15 below.

Now with reference to FIGS. 7-10 and 14-15, the construction of the second connector housing 5 will be described. In one embodiment, the second connector housing 5 includes a block 15 of rigid material, such as plastic, ceramic or metal. The block 15 includes a generally square cavity 17. A bottom of the cavity 17 is defined by a floor 19, best seen in the close-up view in FIG. 8. The floor 19 may be attached to the block 15 by a plurality of attachment devices 21, such as split pins or screws. In the illustrated embodiment, three attachment devices 21 are shown. However, more or fewer attachment devices 21 may be included, as desired. Alternatively, the floor 19 may be integrally formed with the block 15 during fabrication of the block 15.

Figure 9:
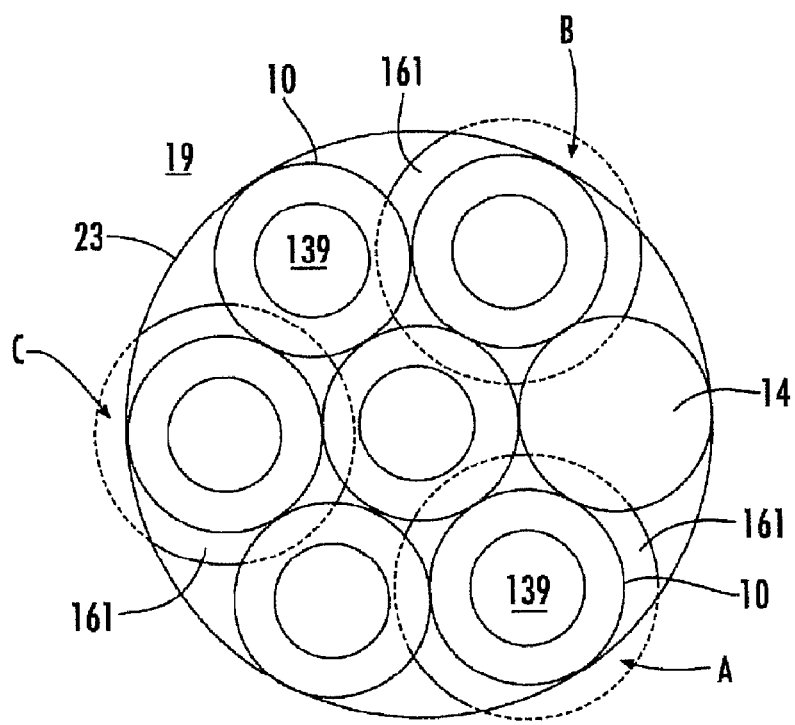
FIG. 9 is a plan view of the grouping of FIG. 8 illustrating how washers act to interlock the termini and guidance feature.

In the illustrated embodiment, the floor 19 includes four circular openings 23. The openings 23 define the location of the groupings of the termini, e.g., the second termini 9 and the fourth termini 10, within the cavity 17. FIG. 9 is an overhead close-up view of the opening 23 illustrated in FIG. 8, which is partially in phantom. The opening 23 is loaded with the six termini 10 and the fourth guidance feature 14. As illustrated, three of the termini 10 have the washer 161 (FIG. 6) installed thereon. The remaining three termini 10 have their gaps 159 open to receive the washers 161 of the adjacent and abutting termini 10. Likewise, the fourth guidance feature 14 receives the washers 161 of two adjacent and abutting termini 10. The protruding parts of the washers 161 indicated at areas A, B and C abut the undersurface of floor 19. By the interlocking arrangement of the washers 161 into the adjacent and abutting termini 10 and the guidance feature 14, the six termini 10 and the guidance feature 14 are prohibited from movement in one direction, e.g., out of the page in FIG. 9.

Figure 10:
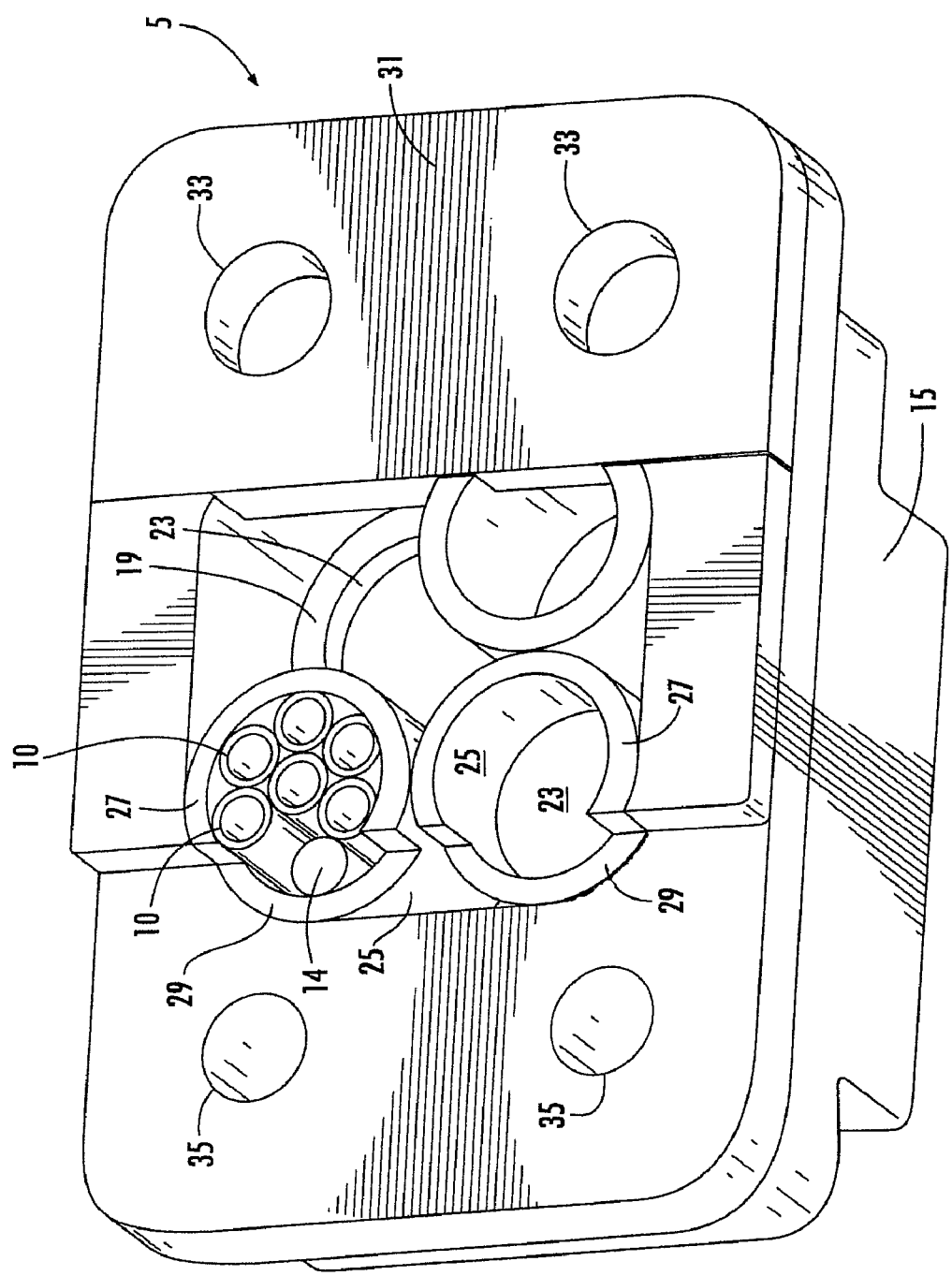
FIG. 10 is a perspective view of an underside of the second connector half.

Now, with reference to FIG. 10, the structures that prohibit the six termini 10 and the guidance feature 14 from movement in the opposite direction, e.g., into the page in FIG. 9, will be described. FIG. 10 is a perspective view of an underside of the second connector housing 5 in a partially assembled state. In FIG. 10, only the fourth grouping or cluster of termini 10 (top left in FIG. 10) is in place, passing through one of the openings 23 in the floor 19. The other three groupings of termini have been removed to simplify the illustration.

A containment sleeve 25 surrounds the fourth grouping of abutting termini 10 and the guidance feature 14. An inside rim of the containment sleeve 25 directly contacts the washers 161 at the areas A, B and C and presses the washers 161 into contact with the undersurface of the floor 19. The containment sleeve 25 includes an outside rim 27, opposite the inside rim. The outside rim 27 includes a notched-out portion 29.

One of two lower plates 31 (See FIG. 7) is positioned over the notched-out portion 29. The lower plate 31 is attached to the bottom of the block 15, by fastening means, such as screws 36 (See FIGS. 7, 14 and 15), which pass through holes 33 formed in the lower plates 31 and into threaded holes 35 formed in the block 15 of the second connector housing 5. By this arrangement, the group of termini 10 and the guidance feature 14 are held within the second connector housing 5. Also, by this arrangement, an inner edge of the lower plate 31, residing in the notched-out portion 29, contacts sides of two of the abutting termini 10, which moves and/or holds the entire group of termini 10 within the containment sleeve 25 into a coarse rotational alignment relative to the second connector housing 5. The rotational alignment would result in the guidance feature 14 residing beneath the lower plate 31, e.g., the guidance feature would reside at about a nine o'clock position (from the perspective of FIG. 10).

Each of the second and fourth guidance features 13 and 14 would have a same diameter as a terminus 103. However, as best seen in FIG. 7, the second and fourth guidance features 13 and 14 extend further out than the termini 9 and 10. In one embodiment, the second and fourth guidance features 13 and 14 are formed as extended length ferrules 105, with the retaining sleeve 121 and the cap sleeve 151 attached thereto in such a manner as to form the gap 159 for receiving a washer 161. However, the second and fourth guidance features 13 and 14 would not include an optical fiber 133 or a lens 139, as the second and fourth guidance features 13 and 14 merely serve as alignment pins when the second connector housing 5 is mated to the first connector housing 3, as will be more fully explained below.

Figure 11:
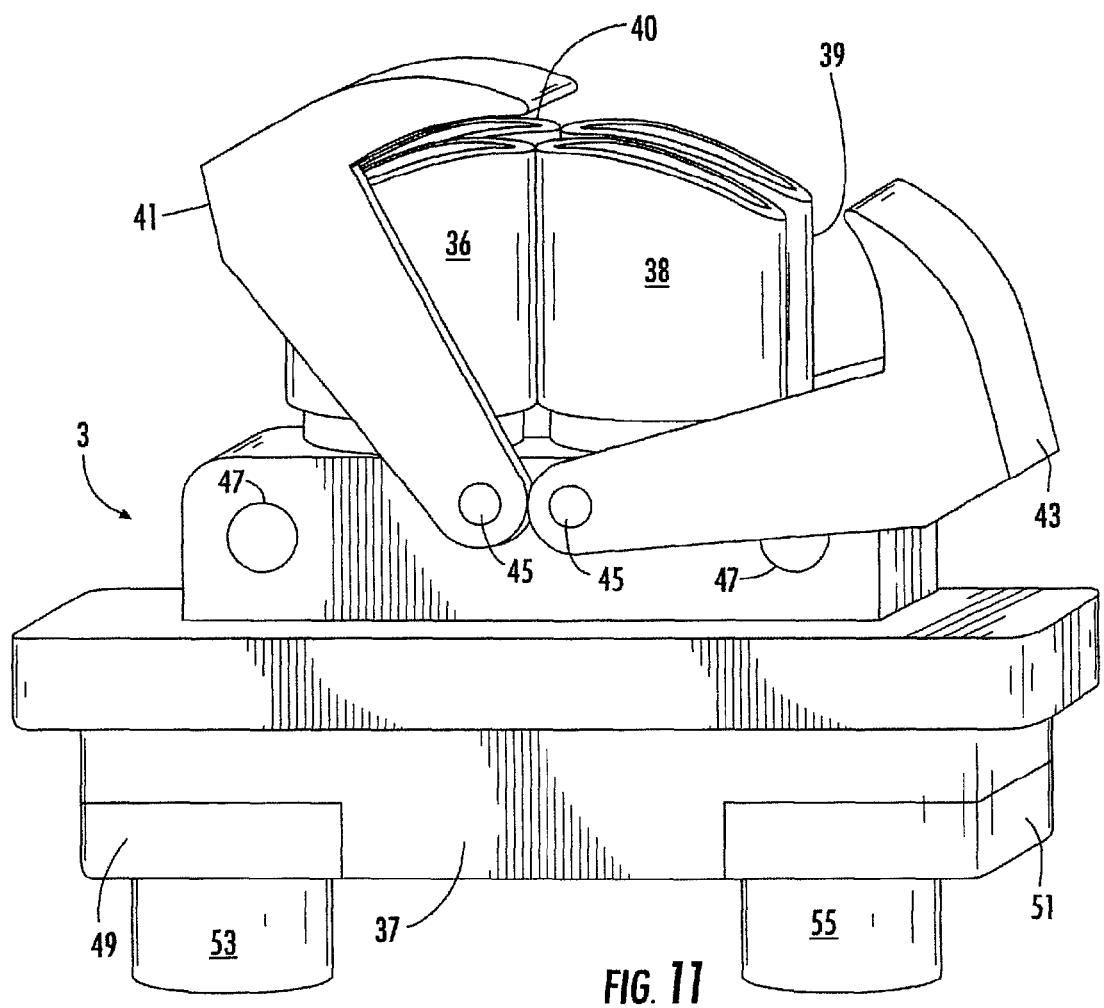
FIG. 11 is a perspective view of a side of the first connector half.

FIG. 11 is a side view of the first connector housing 3 of FIG. 7. The first connector housing 3 shares some common designs with the second connector housing 5 and also includes several different structures. The first connector housing 3 has a block 37 formed of a rigid material, such as plastic, ceramic or metal. Four upper containment sleeves 36, 38, 39 and 40 extend from the top of the block 37. Within each upper containment sleeve 36, 38, 39 and 40, there resides a group of six abutting termini and a guidance feature (e.g. first termini 7 and guidance feature 11 in containment sleeve 36, third termini 8 and guidance feature 12 in containment sleeve 38, etc.). Lens 139 of the abutting termini face toward the open end of the upper containment sleeve 36, 38, 39 and 40 (upward in FIG. 11) and toward the lens 139 of the termini of a mating second connector housing 5, as shown in FIG. 15.

First and second shutters 41 and 43 are attached to the block 37 of the first connector housing 3 at pivot hinges 45. FIG. 11 shows the left shutter 41 in closed state and the right shutter 43 in an open state. When the first connector housing 3 is not mated to the second connector housing 5, the natural position of the first and second shutters 41 and 43 would be in the closed state, blocking access to the interior of the first connector housing 3 and more particularly preventing debris from entering the upper containment sleeves 36, 38, 39 and 40. When the second connector housing 5 is mated to the first connector housing 3, the physical contact between the first and second connector housings 3 and 5 causes both shutters 41 and 43 to pivot open, or the shutters 41 and 42 may be manually opened, hence providing access to the upper containment sleeves 36, 38, 39 and 40. Optionally, the second connector housing 5 may include shutters of a same or similar design.

FIG. 11 also illustrates a plurality of attachment devices 47, such as split pins or screws. In the illustrated embodiment, two attachment devices 47 are shown. However, more or fewer attachment devices 47 may be included, as desired. The attachment devices 47 pass thorough cutouts in the sidewalls of the upper containment sleeves 36, 38, 39 and 40 to attach the upper containment sleeves 36, 38, 39 and 40 to the block 37 of the first connector housing 3, as best seen in the cross sectional views of FIGS. 13 and 15. Alternately, the upper containment sleeves 36, 38, 39 and 40 may be integrally formed with the block 37 during fabrication of the block 37.

Figure 12:
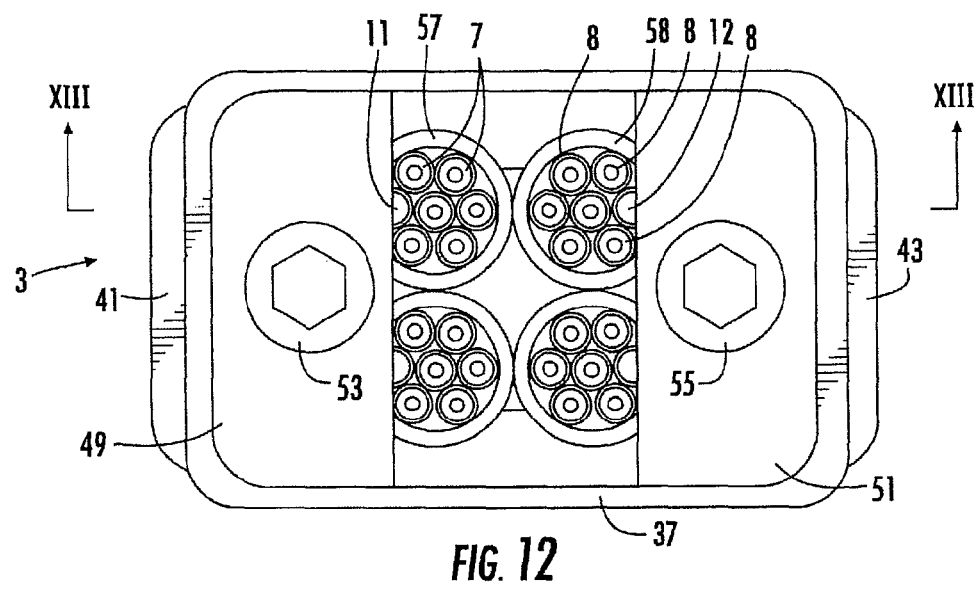
FIG. 12 is a plan view of an underside of the first connector half.

FIG. 12 is a plan view of a back of the first connector housing 3 in a fully assembled state. The back includes first and second plates 49 and 51 attached to the block 37 by first and second fasteners 53 and 55, such as screws. The first and second plates 49 and 51 engage and hold lower containment sleeves, e.g., the first and second lower containment sleeves 57 and 58, in a same manner as illustrated and described in relation to FIG. 10 in conjunction with how the plate 31 held the sleeve 25. For example, an inside rim of the lower containment sleeve 57 is pressed against areas A, B and C on lower faces of the washers 161, which interlock the first grouping of first termini 7 and the first guidance feature 11 together. The areas A, B and C on the upper faces of the washers 161 press against an inside rim of the first upper containment sleeve 36. Likewise, an inside rim of the lower containment sleeve 58 is pressed against areas A, B and C on lower faces of the washers 161, which interlock the third grouping of third termini 8 and the third guidance feature 12 together. The areas A, B and C on the upper faces of the washers 161 press against an inside rim of the second upper containment sleeve 38.

Figure 13:
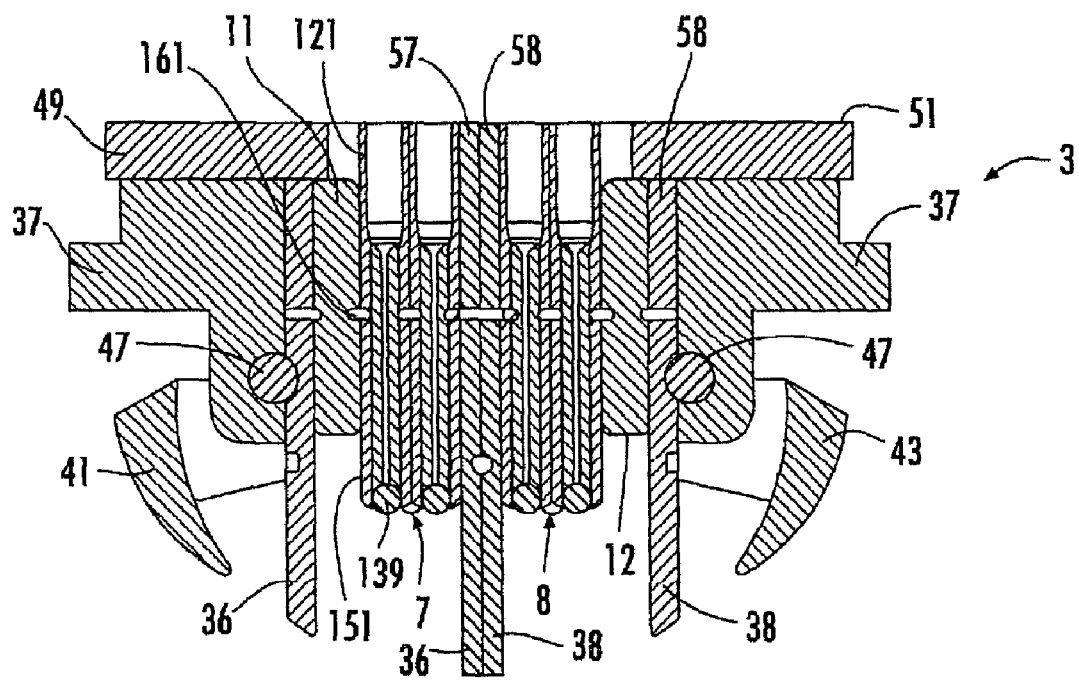
FIG. 13 is a cross sectional view taken along line XIII-XIII in FIG. 12.

Each of the first and third guidance features 11 and 12 would have a same diameter as a terminus 103. However, as best seen in FIGS. 13 and 15, the first and third guidance features 11 and 12 are shorter than the termini 7 and 8. In one embodiment, the first and third guidance features 11 and 12 are formed as short length ferrules 105, with the retaining sleeve 121 and the cap sleeve 151 attached thereto in such a manner to form the gap 159 for receiving a washer 161. However, the first and third guidance features 11 and 12 would not include an optical fiber 133 or a lens 139, as the first and third guidance features 11 and 12 merely serve as a short alignment pin to create a void space amongst the distal ends of the termini 7 and 8. The void space is for receiving the second and fourth guidance features 13 and 14, when the second connector housing 5 is mated to the first connector housing 3, as best seen in FIG. 15.

Figure 14:
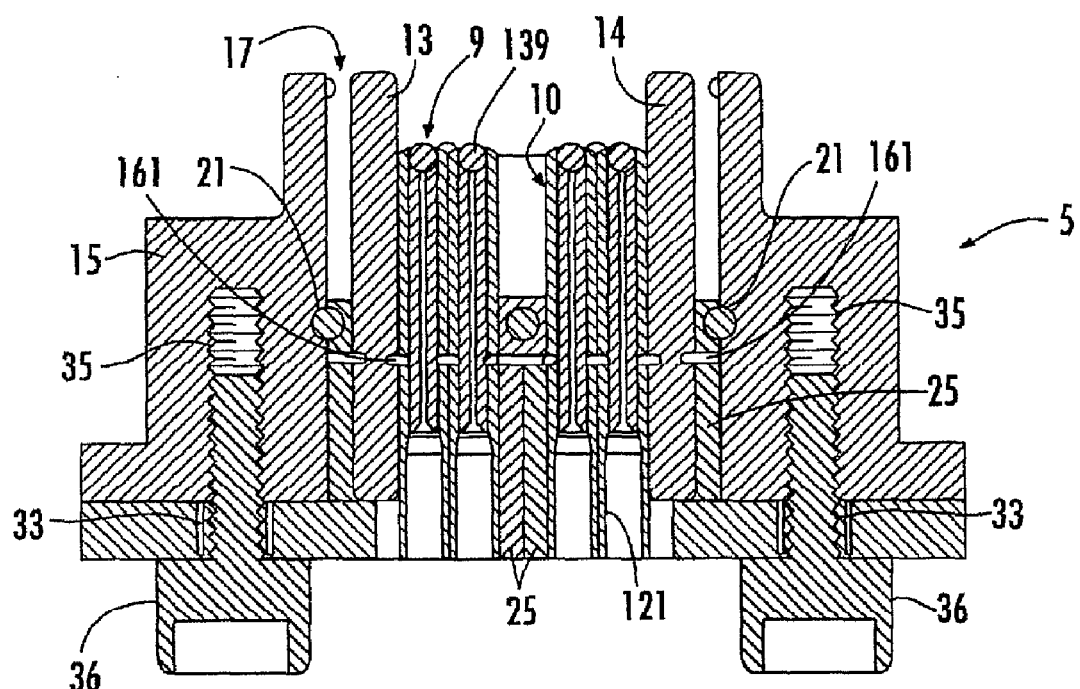
FIG. 14 is a cross sectional view taken along line XIV-XIV in FIG. 7.

As seen in the cross sectional views of FIGS. 13 and 14, prior to mating the first and second connector housings 3 and 5, the first grouping of termini 7 is aligned with the second grouping of termini 9, and the third grouping of termini 8 is aligned with the fourth grouping of termini 10. Of course, the remaining two groupings of termini of the first connector housing 3 would also be aligned with the remaining two groupings of termini in the second connector housing 5. Also, it is envisioned that the connector could have more or fewer than four aligned groupings, if more or fewer channels were needed. Also, the groupings could have more or fewer than six termini and one guidance feature. For example, each grouping could have six termini about one guidance feature surrounded by an additional sixteen termini.

As the second connector housing 5 is mated to the first connector housing 3, the second guidance feature 13 cooperates with the first guidance feature 11, e.g., enters into the void space created thereby, and the plurality of abutting second termini 9 enter into the containment sleeve 36 to assume an end-to-end alignment (e.g., lens-to-lens alignment) with the plurality of abutting first termini 7. Likewise, the fourth guidance feature 14 cooperates with the third guidance feature 12, e.g., enters into the void space created thereby, and the plurality of abutting fourth termini 10 enter into the containment sleeve 38 to assume an end-to-end alignment (e.g., lens-to-lens alignment) with the plurality of abutting third termini 8.

The connector of the present invention shows improvements over the connectors of the background art. In the background art, it was imperative to have rigid positioning of the individual ferrules in a connector housing in precise locations spaced from each other within the connector housing. Otherwise, the ferrules would not line up with the ferrules of a mating connector housing. In the present invention, the ferrules of a first connector half are caused to enter into a containment sleeve of a second connector half. The containment sleeve brings the ferrules into precise alignment with the mating ferrules of the second connector half in a very dense and compact manner.

Moreover, in the present invention, the locking plates 31, 49, 51 may be easily removed from a connector half 3 or 5, so that an individual channel (e.g., terminus 103) of the multi-channel connector may be repaired or replaced. In connectors of the background art, the individual channels were typically precisely molded in a fixed positioned within a connector half and failure of one channel required replacement of the entire multi-channel connector. By the present invention, a field technician can repair and/or replace a single terminus 103 of the multi-channel connector, thereby saving time and money.

With reference to FIG. 10, a method of repairing a multi-channel fiber optic connector will be described. In FIG. 10, the technician has already removed the left side locking plate 31 from the block 15 of the second connector housing 5. The technician would remove the containment sleeve 25 along with the six termini 10 and the guidance feature 14. Once, the six termini 10 and the guidance feature 14 are slid out of the containment sleeve 25, the six termini 10 and the guidance feature 14 may be separated from each other, as the washers 161 of the three termini 10 will freely separate from the gaps 159 of the other three termini 10 and the guidance feature 14.

The technician can then repair or replace an individual terminus 10. Replacement could be achieved using a jumper, if needed. Repair and replacement techniques are described in Applicant's co-pending application Ser. No. 12/337,212, filed Dec. 17, 2008, which is incorporated herein by reference.

After the repair or replacement of one or more termini 10, the technician forms the grouping by abutting termini 10 and the guidance feature 14 and aligning the washers 161 into the gaps 159 (See FIG. 9). The technician then slides the containment sleeve 25 over the grouping to hold it together. Next the containment sleeve 25, with the grouping therein, is inserted into the second connector housing 5, such that the grouping passes through the opening 23 in the floor 19 and the edges of the washers 161 at areas A, B and C abut under the floor 19. Finally, the locking plate 31 is attached to the block 15 using threaded fasteners 36, thereby securing the grouping to the second connector housing 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A fiber optic connector comprising:
a first connector housing including a plurality of first termini directly abutting each other, a first guidance feature amongst said plurality of abutting first termini, wherein said first guidance feature directly abuts at least one first termini of said plurality of abutting first termini, and a containment sleeve surrounding said plurality of abutting first termini and said first guidance feature; and
a mating, second connector housing including a plurality of second termini directly abutting each other and a second guidance feature amongst said plurality of abutting second termini, wherein when said first and second connector housings are mated, said first guidance feature cooperates with said second guidance feature, and said plurality of abutting second termini enter into said containment sleeve to assume an end-to-end alignment with said plurality of abutting first termini.

2. The fiber optic connector of claim 1, wherein said first guidance feature includes a void amongst said plurality of first termini, and said second guidance feature is an alignment pin which fills said void when said first and second connector housings are mated.

3. The fiber optic connector of claim 1, wherein said first guidance feature is a first alignment pin amongst said plurality of abutting first termini, which leaves a void amongst distal ends of said plurality of abutting first termini;

wherein said second guidance feature is a second alignment pin amongst said plurality of abutting second termini which protrudes past distal ends of said plurality of abutting second termini; and wherein said second alignment pin fills said void when said first and second connector housings are mated.

4. The fiber optic connector of claim 1, wherein said containment sleeve is circular in cross section.

5. The fiber optic connector of claim 4, wherein said plurality of abutting first termini consists of six termini.

6. The fiber optic connector of claim 1, wherein each termini of said plurality of first and second termini includes a ferrule fixing a single optical fiber.

7. The fiber optic connector of claim 6, wherein each termini of said plurality of first and second termini also includes a lens attached at an end of said ferrule.

8. The fiber optic connector of claim 1, further comprising:

at least one shutter attached to said first connector housing, wherein said at least one shutter blocks access to an interior of said first connector housing when said first and second connector housings are not mated, and allows access to the interior of said first connector housing when said first and second connector housings are mated.

9. The fiber optic connector of claim 1, wherein said plurality of abutting first termini and said first guidance feature amongst said plurality of abutting first termini form a first grouping, wherein said containment sleeve is a first containment sleeve surrounding said first grouping, wherein said plurality of abutting second termini and said second guidance feature amongst said plurality of abutting second termini form a second grouping, and wherein said fiber optic connector further comprises:

said first connector housing further including a plurality of abutting third termini and a third guidance feature amongst said plurality of abutting third termini to form a third grouping, and a second containment sleeve surrounding said third grouping; and said second connector housing further including a plurality of abutting fourth termini and a fourth guidance feature amongst said plurality of abutting fourth termini to form a fourth grouping, wherein when said first and second connector housings are mated, said first guidance feature cooperates with said second guidance feature, said third guidance feature cooperates with said fourth guidance feature, said plurality of abutting second termini enter into said first containment sleeve to assume an end-to-end alignment with said plurality of abutting first termini, and said plurality of abutting fourth termini enter into said second containment sleeve to assume an end-to-end alignment with said plurality of abutting third termini.

10. A fiber optic connector comprising:
a connector housing;
a plurality of termini directly abutting each other attached within said connector housing; and
a guidance feature amongst said plurality of abutting termini, wherein said guidance feature directly abuts at least one termini of said plurality of abutting termini, wherein each termini of said plurality of abutting termini includes a ferrule fixing an optical fiber and a lens attached at an end of said ferrule, wherein said guidance feature includes a pin, and wherein said pin extends past ends of said plurality of abutting termini.

11. The fiber optic connector of claim 10, further comprising:
a containment sleeve surrounding said plurality of abutting termini and said guidance pin.

12. The fiber optic connector of claim 11, wherein said containment sleeve is circular in cross section.

13. The fiber optic connector of claim 11, wherein said plurality of abutting termini includes six termini.

14. The fiber optic connector of claim 10, further comprising:

at least one shutter attached to said connector housing, wherein said at least one shutter blocks access to an interior of said connector housing when said connector housing is not mated, and allows access to the interior of said connector housing when said connector housing is mated to another connector housing.

15. A method of repairing a multi-channel fiber optic connector comprising:
providing a connector housing including a plurality of first termini directly abutting each other, a first guidance feature amongst said plurality of abutting first termini, and a containment sleeve surrounding said plurality of abutting first termini and said first guidance feature;
removing a locking plate from the connector housing;
withdrawing one or more first termini from the connector housing;
repairing or replacing at least one of the withdrawn termini;
replacing the withdrawn termini into the connector housing; and
attaching the locking plate to the connector housing.

16. The method of claim 15, wherein each terminus of the one or more first termini includes a ferrule supporting an optical fiber with a lens attached to an end of the ferrule.

17. The method of claim 15, wherein the locking plate is removed from and attached to the connector housing threaded fasteners, and wherein the locking plate secures the one or more first termini to the connector housing.

18. The fiber optic connector of claim 1, wherein said second guidance feature directly abuts at least one second termini of said plurality of abutting second termini.

19. The fiber optic connector of claim 1, wherein at least one termini of said plurality of abutting first termini includes a washer which engages into a gap formed on another terminus of said plurality of abutting first termini.

20. The fiber optic connector of claim 10, wherein said connector housing is a first connector housing and said guidance feature is a first guidance feature, and further comprising:
a second connector housing with a second guidance feature, and wherein said first guidance feature cooperates with said second guidance feature when said first connector housing mates with said second connector housing.

* * * * *

UNITED STATES PATENT AND TRADEMARK OFFICE
CERTIFICATE OF CORRECTION

| | | |
|---|---|---|
| PATENT NO. | : 8,038,354 B2 | Page 1 of 1 |
| APPLICATION NO. | : 12/363100 | |
| DATED | : October 18, 2011 | |
| INVENTOR(S) | : Jeffrey D. Nielson and Bradley Billman | |

It is certified that error appears in the above-identified patent and that said Letters Patent is hereby corrected as shown below:

Col. 12, line 46-49; should read:
17. The method of claim 15, wherein the locking plate is removed from and attached to the connector housing --using-- threaded fasteners, and wherein the locking plate secures the one or more first termini to the connector housing.

Signed and Sealed this
Twentieth Day of December, 2011

David J. Kappos
*Director of the United States Patent and Trademark Office*